(12) United States Patent
Ayala

(10) Patent No.: US 12,285,966 B2
(45) Date of Patent: Apr. 29, 2025

(54) SECURE MULTI-LAYERED STRUCTURE COMPRISING MULTIPLE APERTURES

(71) Applicant: HID Global Ireland Teoranta, Galway (IE)

(72) Inventor: Stéphane Ayala, Oron la ville (CH)

(73) Assignee: HID Global Ireland Teoranta, Galway (IE)

( * ) Notice: Subject to any disclaimer, the term of this patent is extended or adjusted under 35 U.S.C. 154(b) by 336 days.

(21) Appl. No.: 17/593,266

(22) PCT Filed: Mar. 31, 2020

(86) PCT No.: PCT/EP2020/059163
§ 371 (c)(1),
(2) Date: Sep. 14, 2021

(87) PCT Pub. No.: WO2020/201303
PCT Pub. Date: Oct. 8, 2020

(65) Prior Publication Data
US 2022/0161589 A1 May 26, 2022

(30) Foreign Application Priority Data
Apr. 2, 2019 (EP) .................................... 19166899

(51) Int. Cl.
*B42D 25/351* (2014.01)
*B32B 3/26* (2006.01)
(Continued)

(52) U.S. Cl.
CPC ............ *B42D 25/346* (2014.10); *B32B 3/266* (2013.01); *B32B 27/08* (2013.01); *B32B 27/365* (2013.01);
(Continued)

(58) Field of Classification Search
CPC .............................. B42D 25/351; B42D 25/44
See application file for complete search history.

(56) References Cited

U.S. PATENT DOCUMENTS 1,469,554 A * 10/1923 Crowder .................. B44D 3/18
434/85
5,753,064 A * 5/1998 Kikinis .................... B41M 5/52
283/105
(Continued)

FOREIGN PATENT DOCUMENTS

| DE | 19934434 A1 | 2/2001 | |
| GB | 2542786 A * | 4/2017 | ............. B42D 25/21 |

(Continued)

OTHER PUBLICATIONS

KR20160080255A English Translation (Year: 2016).*
(Continued)

*Primary Examiner* — Kyle R Grabowski
(74) *Attorney, Agent, or Firm* — Schwegman Lundberg & Woessner, P.A.

(57) ABSTRACT

A secure multi-layered structure (14), for example, for a secure document, the secure multi-layered structure comprising a first layer (20) having a first aperture (25) opened in the first layer, a second layer (30) having a second aperture (35) opened in the second layer, and a third layer (40) having a third aperture (45) opened in the third layer, wherein each layer at least partially overlaps with the layer adjacent to it, at least a portion of the third layer being visible through the first aperture.

13 Claims, 2 Drawing Sheets

(51) Int. Cl.
- *B32B 27/08* (2006.01)
- *B32B 27/36* (2006.01)
- *B32B 27/40* (2006.01)
- *B32B 38/04* (2006.01)
- *B42D 25/346* (2014.01)
- *B42D 25/387* (2014.01)
- *B42D 25/44* (2014.01)
- *B42D 25/47* (2014.01)
- *B42D 25/475* (2014.01)
- *B42D 25/435* (2014.01)

(52) U.S. Cl.
CPC .............. *B32B 27/40* (2013.01); *B32B 38/04* (2013.01); *B42D 25/351* (2014.10); *B42D 25/387* (2014.10); *B42D 25/47* (2014.10); *B42D 25/475* (2014.10); *B32B 2038/042* (2013.01); *B32B 2307/412* (2013.01); *B32B 2307/422* (2013.01); *B32B 2451/00* (2013.01); *B42D 25/435* (2014.10)

(56) References Cited

U.S. PATENT DOCUMENTS

| | | | | |
|---|---|---|---|---|
| 2007/0274559 | A1* | 11/2007 | Depta | B41J 2/442 382/100 |
| 2012/0176652 | A1* | 7/2012 | Green | B42D 25/346 358/3.28 |
| 2015/0124020 | A1* | 5/2015 | Peinze | B42D 25/378 347/20 |

FOREIGN PATENT DOCUMENTS

| | | | |
|---|---|---|---|
| KR | 101166652 | B1 * | 7/2012 |
| KR | 20160080255 | A * | 7/2016 |
| WO | WO-2020201303 | A1 | 10/2020 |

OTHER PUBLICATIONS

KR101166652B1 English Translation (Year: 2012).*
"European Application Serial No. 19166899.5, Response filed Aug. 30, 2021 to Communication Pursuant to Article 94(3) EPC mailed May 20, 2021", 22 pgs.
"International Application Serial No. PCT/EP2020/059163, International Preliminary Report on Patentability mailed Oct. 14, 2021", 7 pgs.
"European Application Serial No. 19166899.5, Communication Pursuant to Article 94(3) EPC mailed Dec. 14, 2021", 7 pgs.
"European Application Serial No. 19166899.5, Response filed Mar. 21, 2022 to Communication Pursuant to Article 94(3) EPC mailed Dec. 14, 2021", 18 pgs.
"European Application Serial No. 19166899.5, Communication Pursuant to Article 94(3) EPC mailed May 20, 2021", 4 pgs.
"European Application Serial No. 19166899.5, Response filed to Extended European Search Report mailed Oct. 12, 2020", 19 pgs.
"International Application Serial No. PCT/EP2020/059163, International Search Report mailed May 20, 2020", 5 pgs.
"International Application Serial No. PCT/EP2020/059163, Written Opinion mailed May 20, 2020", 5 pgs.
"European Application Serial No. 19166899.5, Communication Pursuant to Article 94(3) EPC mailed Oct. 25, 2022", 4 pgs.
"European Application Serial No. 19166899.5, Response Filed Feb. 23, 2023 to Communication Pursuant to Article 94(3) EPC mailed Oct. 25, 2022", 7 pgs.

* cited by examiner

SECURE MULTI-LAYERED STRUCTURE COMPRISING MULTIPLE APERTURES

This application is a national stage application under 35 U.S.C. § 371 of PCT Appl. No. PCT/EP2020/059163, titled "Secure Multi-layered Structure Comprising Multiple Apertures," filed Mar. 31, 2020, which claims priority to European Pat. Appl. No. 19166899.5, titled "Secure Multi-layered Structure Comprising Multiple Apertures," filed Apr. 2, 2019, each of which is hereby incorporated by reference herein in its entirety.

The present disclosure is generally directed toward security features and more particularly toward security features in multi-layered structures.

Identification documents are often used to prove one's identity. However, the possibility of counterfeit identity documents exists and, as such, the need to combat such counterfeiting arises, especially when documents are relied upon for security or access control purposes.

Identification documents in the form of identification cards (e.g., passports, secure cards, etc.) are used in a wide array of applications including access control, identification, and financial transfer applications. Secure documents typically consist of a multi-layered structure including various layers which carry information (e.g., alphanumeric information, logos, and/or a picture of the card holder) and security features.

Well-known counterfeit countermeasures exist such as holograms and/or images that can be revealed by being exposed to ultraviolet lights through apertures punched in one or more layers of the multi-layered structure composing the identification document. However, counterfeiting operations constantly evolve to try and keep up with the countermeasures. Accordingly, the need exists to continue developing counterfeiting countermeasures (e.g., security features) for identification documents and other objects that carry an inherent level of trust.

According to an aspect of the present invention, there is provided a secure multi-layered structure as defined in appended claim 1.

As a solution to this problem, this disclosure describes example secure multi-layered structures, in particular for a secure document, comprising a first layer having a first aperture opened in the first layer, a second layer having a second aperture opened in the second layer, and a third layer having a third aperture opened in the third layer, wherein each layer at least partially overlaps with the layer adjacent to it, at least a portion of the third layer being visible through the first aperture.

Having three layers, each comprising an aperture, and that each layer overlaps with the adjacent layer, the third layer being visible through the first aperture, creates a central aperture having "steps," which makes the secure multi-layered structure particularly difficult to counterfeit.

In order to render the secure multi-layered structures according to the disclosure more difficult to reproduce, at least one of the first, second, and third layers can comprise a printed region comprising, for instance, a photoluminescent material, for example, an ultraviolet fluorescent material. Owing to the presence of the photoluminescent material, the authenticity of the secure document can be tested by shining a light towards the secure element.

In order to render the secure multi-layered structures according to the disclosure more difficult to reproduce, at least one of the first, second, and third apertures can be cut through the printed region of the first, second, and third layers, respectively.

In order to protect the layers of a secure multi-layered structure while maintaining the layers visible, the secure multi-layered structure can comprise a covering and/or base layer, wherein the covering layer and/or base layer transmits at least one of ultraviolet light, visible light, and infrared light.

According to an example embodiment, the covering layer and/or base layer comprises a transparent or semi-transparent material.

According to an example embodiment, the covering layer and/or base layer comprises at least one of transparent polycarbonate (PC) and thermoplastic polyurethane (PU).

In order to render the secure multi-layered structures according to the disclosure more difficult to reproduce, at least one of the first, second, and third layer can comprise a laser-engraved and/or printed region.

In order to render the secure multi-layered structures according to the disclosure even more difficult to reproduce, the first, second, and third layer can each comprise a laser-engraved and/or printed region.

The respective printed regions of the first, second, and third layer can comprise parts of a single image, such that, when the first, second, and third layers are superimposed, said image is formed, and such that when the secure multi-layered structure is viewed from above, the image can be viewed in a continuous manner.

In order to make the manufacturing of the secure multi-layered structures more cost-effective, the first, second, and third apertures can be of similar shape.

This disclosure further describes a security document, such as an identification document, comprising a secure multi-layered structure according to the disclosure.

This disclosure also describes a method for producing a secure multi-layered structure, comprising the steps of providing first, second, and third sheets, punching a first aperture in said first sheet, punching a second aperture in said second sheet, the contour of the second aperture being contained within the contour of the first aperture when superimposed, punching a third aperture in said third sheet, the contour of the third aperture being contained within the contour of the second aperture when superimposed, and laminating the first, second, and third sheets by aligning them so that each sheet at least partially overlaps with the sheet adjacent to it, the third sheet being at least partially visible through the first aperture.

In order to fill the space created by the apertures in the secure multi-layered structure, the method can further comprise the step of filling the first, second, and third apertures with liquid material, for example, transparent glue, or by adding transparent polycarbonate patches.

In order to protect the layers of a secure multi-layered structure while maintaining the layers visible, the method can further comprise the step of laminating a covering layer and/or a base layer comprising a transparent or semi-transparent material.

The present disclosure will be further understood from the following detailed description. Non-limiting embodiments of the description will now be described using the attached figures in which.

Figure 1:
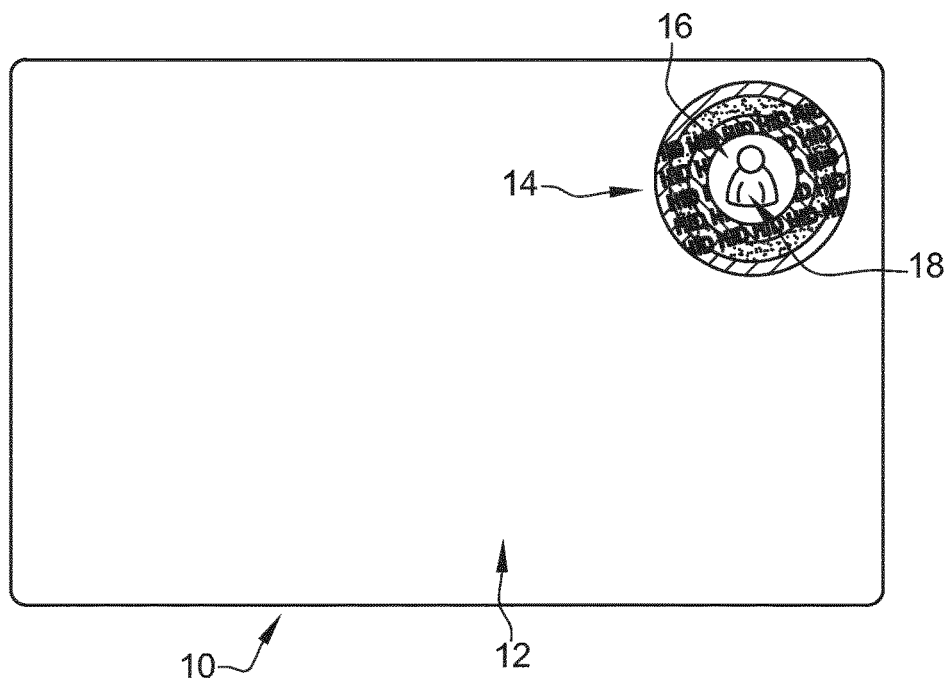
FIG. 1 is a top view of an identification document in accordance with embodiments of the present disclosure.
Figure 2:
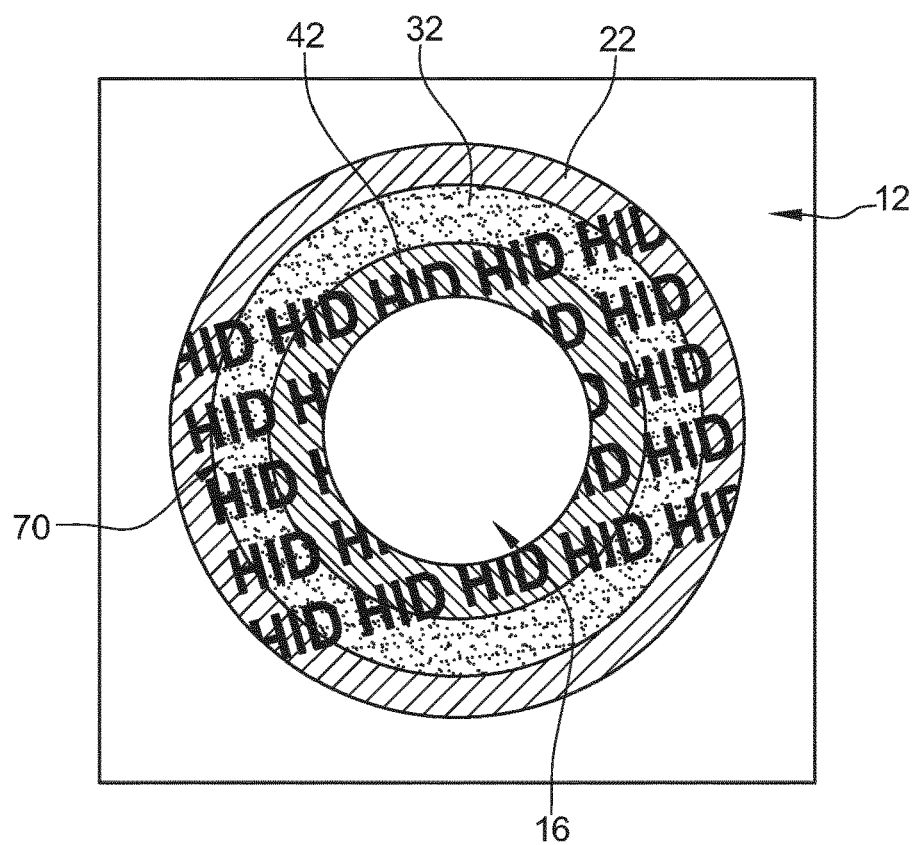
FIG. 2 is a top view of the secure multi-layered structure of the identification document of FIG. 1.

With reference now to FIGS. 1 and 2, secure multi-layered structures for an identification document and a method for producing such multi-layered structures will be described. While the description and figures are generally directed toward secure multi-layered structures in identification documents, it should be appreciated that embodiments of the present disclosure are not so limited. Moreover, it should be noted that the concepts disclosed herein can be utilized in other multi-layered structures and do not necessarily have to be applied to identification documents.

With reference initially to FIG. 1, a multi-layered structure 10, such as an identification document, is shown. The multi-layered structure 10 is depicted as being in card form, the shape of the card being rectangular, but other forms or shapes could be considered. The multi-layered structure 10 is shown to include a card body 12 with a first secure multi-layered structure 14 incorporated therein.

The secure multi-layered structure 14 comprises a central aperture 16 the purpose of which is, among others, to make an image, for example, a photograph 18 of the holder of the identification document, visible.

FIG. 2 depicts further details of the construction of a particular embodiment of the secure multi-layered structure 14. Here it should be noted that the relative thicknesses of the different layers of the multi-layered structure 14 as depicted in the Figures do not necessarily correspond to the actual thicknesses of these layers and are only so represented for comprehension purposes. In particular, the layers do not necessarily need to exhibit the same thickness. Furthermore, the thickness of each layer and the relative thicknesses of each layer should not be construed as being limited to any particular dimension.

The secure multi-layered structure shown in FIGS. 2-7 comprises a first layer 20, a second layer 30, and a third layer 40, in one embodiment preferably layered or structured in this order. Advantageously, all layers can be made out of sheets of the same dimension so as to be easily layered or structured together.

Figure 3:
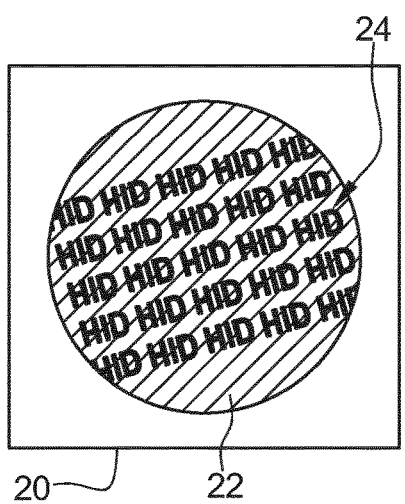
FIG. 3 is a top view of the first layer of the secure multi-layered structure of the identification document of FIG. 1 before the first aperture has been punched out of the first layer.

As can be seen on FIG. 3, the first layer 20 can be made out of an opaque sheet of plastic or polymer, optionally laser engravable or printable for personalization. The first layer 20 comprises a printed region 22 comprising, for instance, a photoluminescent material, such as but not limited to an ultraviolet fluorescent material. In the example shown in the Figures, the printed region 22 has a circular shape, but any other shape can be considered, such as a square, triangular, star, etc. In an example, the whole printed region 22 is filled with photoluminescent ink or the like.

In addition, the first layer 20 can also comprise a laser-engraved and/or printed region 24. The region 24 depicts an image, letters, or numbers which can be decorative in nature but can also constitute a security feature in itself as it has to be reproduced. The region 24 may also contain secure data, typically data relative to the person to which the secure document belongs to, such as their name, address, etc. Said region 24 is here represented by the letters "HID."

The region 24 here is optionally overlain on the printed region 22. It may occupy the whole printed region 22 or cover only part of it. In other embodiments, the region 24 may also cover another portion of the first layer 20.

Figure 4:
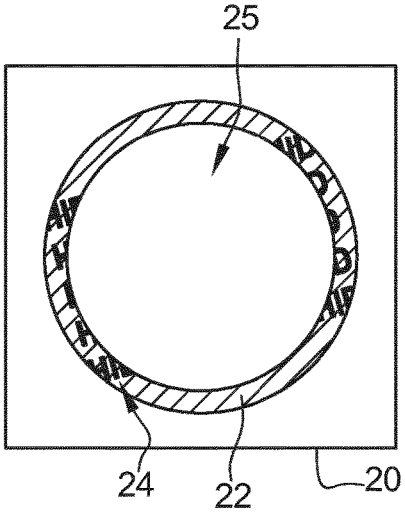
FIG. 4 is a top view of the first layer of the secure multi-layered structure of the identification document of FIG. 1.

As can be seen in FIG. 4, the first layer 20 can also comprise a first aperture 25 that is see-through and may be, for example, punched out of first layer 20. First aperture 25 can be opened in any region of the first layer 20, for example, in the center thereof.

More particularly, first aperture 25 can be cut through the printed region 22 and can be of various sizes and shapes. Here, first aperture 25 has the same shape as the printed region 22, i.e., the shape of a circle. First aperture 25 has a contour of a slightly smaller diameter than the printed region 22 and occupies most of the total surface of the printed region 22. It should be noted that the circles delimiting the first printed region 22 and the first aperture 25 may be concentric. A purpose of the first aperture 25, among others, is to make the image 18 at least partially visible.

Similar to the first layer 20, the second layer 30 can comprise a second printed region 32 comprising a photoluminescent material and a printed region 34 that can be overlain on the second printed region 32. The second layer 30 also comprises second aperture 35 opened in the second layer 32. The first aperture 25 and the second aperture 35 may be of similar shape, for example, here they are circular. The second aperture 35 can also be cut through the second printed region 32.

Similar to the first 20 and second layers 30, the third layer 30 can comprise a third printed region 42 comprising a photoluminescent material and a third printed region 44 that can be overlain on the third printed region 42. The third layer 40 can also comprise a third aperture 45 opened in the third layer 40. The first aperture 25, second aperture 35, and third aperture 35 may be of similar shape, for example, here they are circular. The third aperture 45 may also be cut through the third printed region 42. The third printed region 42 and the third aperture 45 may be of circular shape.

The first 20, second 30, and third 40 layers are arranged so that each layer at least partially overlaps with the adjacent layer and so that the third layer 40 is at least partially visible through the first aperture 25.

In the example embodiment, this is obtained by the fact that the contour of the second aperture 35 is contained within the contour of the first aperture 25 when superimposed, and that the contour of the third aperture 45 is contained within the contour of the second aperture 35 when superimposed.

Figure 5:
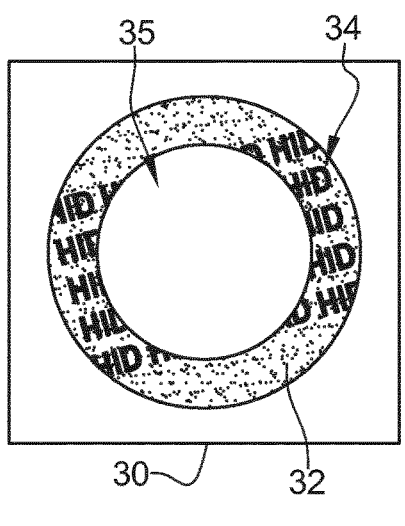
FIG. 5 is a top view of the second layer of the secure multi-layered structure of the identification document of FIG. 1.
Figure 6:
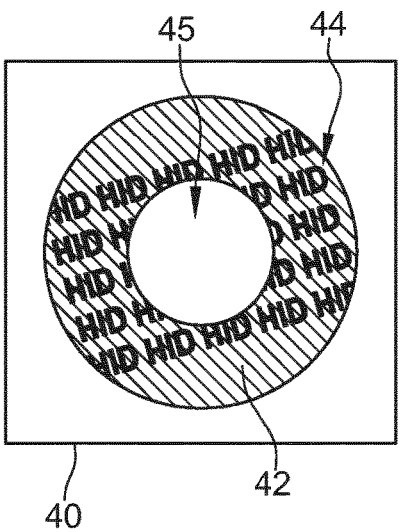
FIG. 6 is a top view of the third layer of the secure multi-layered structure of the identification document of FIG. 1.
Figure 7:
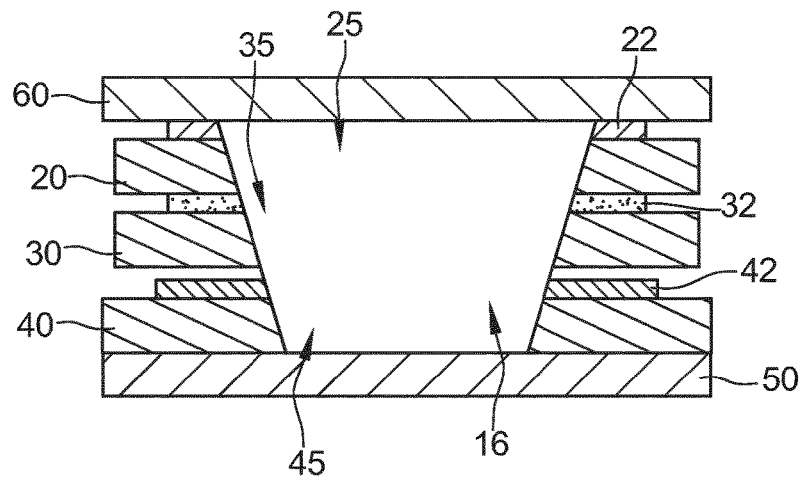
FIG. 7 is a cross-sectional view of the secure multi-layered structure of FIG. 2.

More particularly, in the example embodiment, considering that the first 25, second 35, and third 45 apertures are of similar shape, here a circle, this is obtained by having the diameter of the first aperture 35 greater than the one of the second aperture 45, and having the diameter of the second aperture 35 greater than the one of the third aperture 45, as can be seen by comparing FIGS. 4, 5, and 6. This is made easier by having the first 25, second 35, and third 45 apertures share a common center when superimposed.

It should be appreciated that while only example embodiments are provided illustrating ways of obtaining that each layer overlaps with the adjacent layer, the third layer 40 being visible through the first aperture 25, the invention is not so limited. For instance, this could be obtained with apertures of different shape, or apertures not sharing a common center once superimposed.

As can be understood from above, the central aperture 16 is, as such, formed of the union of the first, second, and third apertures 25, 35, 45. Said central aperture 16 can be filled with liquid material, for example, transparent glue, or by adding transparent polycarbonate patches.

The respective printed regions 24, 34, 44 of the first 20, second 30, and third 40 layers can each comprise parts of a single image 70, such that, when the first 20, second 30, and third 40 layers are superimposed, said image 70 is formed, and such that when the secure multi-layered structure 14 is viewed from above, the image 70 can be viewed in a continuous manner.

The secure multi-layered structure 14 can also comprise a base layer 50 layered or structured under the first 20, second 30, and third layers 40.

The secure multi-layered structure 14 can also comprise a covering layer 60 layered or structured above the first 20, second 30, and third layers 40.

The base layer 50 and the covering layer 60 may transmit at least one of ultraviolet light, visible light, and infrared light. In addition, in order to make the first, second, and third layers 10, 20, 30 visible, they may be made out of a plastic, polymer, or composite material that is transparent or translucent in nature. As one non-limiting example, the base layer 50 and the covering layer 60 may correspond to or comprise a clear sheet of Polycarbonate (PC) or Thermoplastic Polyurethane (TPU). Of course, any other material that is useful in lamination operations and can also exhibit transparent or translucent properties may be utilized.

The presence of the photoluminescent agent can be checked by illuminating the edge of the central aperture 16 and viewing the re-radiated luminescent light emerging from the aperture edge since the base layer 50 and covering layer 60 are at least one of transparent or translucent.

In order to authenticate or verify the authenticity of a secure multi-layered structure 14 according to the present disclosure, a light source providing illumination light can be shone towards the secure multi-layered structure 14. The illumination light may correspond to UV light, IR light, white light, ambient light, or combinations thereof. The illumination light is introduced into the secure multi-layered structure 14 via the aperture edges of the multi-layered structure 10.

The process continues with the observation of light emanating from the covering layer 60. It is then determined whether any of the emanating light has a different characteristic or is otherwise visibly different from the illumination light. This determination may help determine whether the illumination light impacted or encountered the secure multi-layered structure while it was reflecting within the covering layer 60. As an example, if the aperture edge appears to have a rainbow hue or alternating colors that correspond to the alternating colors of an ultraviolet ink, then the determination can be made that the multi-layered structure 10 is authentic. If, on the other hand, the observed light has not changed relative to the illumination light, then the secure multi-layered structure 14 may be determined to be a counterfeit, forgery, or not authentic.

Although only three layers are depicted in the secure multi-layered structure 14, it should be appreciated that a greater number of layers of material may be used without departing from the scope of the present disclosure.

An example method for producing a secure multi-layered structure will now be described. First, a first 20, second 30, and third sheet 40 are provided.

In a second step, a first aperture 25 is punched in said first sheet 20. In an example, the first aperture has a circular shape.

Then, in a third step, a second aperture 35 is punched in said second sheet 30, the contour of the second aperture 35 being contained within the contour of the first aperture 35 when superimposed. The first 25 and second 35 apertures may have a similar shape, for example, a circular shape. The second aperture 35 can have smaller dimensions than the first aperture 25. In the case of the aperture shape being a circle, for example, the diameter of the second aperture 35 can be smaller than the diameter of the first aperture 25.

In a fourth step, a third aperture 45 is punched in said third sheet 35, the contour of the third aperture 45 being contained within the contour of the second aperture 35 when superimposed. The second 35 and third 45 apertures may have a similar shape, for example, a circular shape. The third aperture 45 may have smaller dimensions than the second aperture 35. In the case of the aperture shape being a circle, for example, the diameter of the third aperture 45 can be smaller than the diameter of the second aperture 35.

It should be noted that according to another embodiment, punching the apertures can be performed in a single step, i.e., the second, third, and fourth step can be performed simultaneously.

Following the punching of the apertures, the first 20, second 30, and third 40 sheets are layered or structured by aligning them so that each sheet 20, 30, 40 at least partially overlaps with the adjacent layer 20, 30, 40, the third layer 42 being visible through the first aperture 25.

This can be performed by aligning the sheets 20, 30, 40 so that the first, second, and third 25, 35, 45 apertures share a common center, especially when the apertures are of similar shape, for example, circular.

Then, the first, second, and third 25, 35, 45 apertures can be filled with a transparent material, such as a transparent glue.

Finally, a covering layer 60 and/or a base layer 50 is added to the multi-layered structure 14. Said covering and/or base layer can comprise a transparent or semi-transparent material.

The invention is not limited to the described embodiments and other embodiments shall clearly appear to the skilled person in the art.

The invention claimed is:

1. A method for producing a secure multi-layered structure, the method comprising:
    providing first, second, and third sheets, each of the first, second, and third sheets comprising at least one of a laser-engraved region or printed region;
    punching a first aperture in the at least one of the laser-engraved region or printed region of the first sheet;
    punching a second aperture in the at least one of the laser-engraved region or printed region of the second sheet, the contour of the second aperture configured to be contained within the contour of the first aperture when superimposed;
    punching a third aperture in the at least one of the laser-engraved region or printed region of the third sheet, the contour of the third aperture configured to be contained within the contour of the second aperture when superimposed; and
    laminating the punched first, second, and third sheets by aligning them so that each sheet overlaps at least partially with the sheet adjacent to it, the third sheet being at least partially visible through the first aperture.

2. The method for producing a secure multi-layered structure according to claim 1, further comprising filling the first, second, and third apertures with liquid material.

3. The method for producing a secure multi-layered structure according to claim 2, wherein the liquid material comprises transparent glue.

4. The method for producing a secure multi-layered structure according to claim 1, further comprising filling the first, second, and third apertures using transparent polycarbonate patches.

5. The method for producing a secure multi-layered structure according to claim 1, further comprising laminating at least one of a covering layer or a base layer with the first, second, and third sheets, the at least one of a covering layer or a base layer comprising a transparent or semi-transparent material.

6. The method for producing a secure multi-layered structure according to claim 5, wherein the at least one of the covering layer or base layer comprises at least one of transparent polycarbonate (PC) or thermoplastic polyurethane (PU).

7. The method for producing a secure multi-layered structure according to claim 1, wherein each of the at least one of the laser-engraved regions or printed regions comprises part of a continuous image, wherein following lamination of the first, second, and third sheets, the at least one of the laser-engraved regions or printed regions of the first, second, and third sheets form the continuous image.

8. The method for producing a secure multi-layered structure according to claim 7, further comprising laminating a fourth sheet with the punched first, second, and third sheets, the fourth sheet comprising an image, separate from the continuous image, that is visible through the first, second, and third apertures.

9. The method for producing a secure multi-layered structure according to claim 7, wherein the continuous image, formed following lamination of the first, second, and third sheets, comprises data relating to a person corresponding to the secure multi-layered structure.

10. The method for producing a secure multi-layered structure according to claim 1, wherein at least one of the first, second, or third sheets comprises a printed region comprising a photoluminescent material.

11. The method for producing a secure multi-layered structure according to claim 10, wherein the photoluminescent material comprises an ultraviolet fluorescent material.

12. The method for producing a secure multi-layered structure according to claim 1, wherein the first, second, and third sheets each comprise a printed region comprising a photoluminescent material.

13. The method for producing a secure multi-layered structure according to claim 1, wherein the first, second, and third apertures are of similar shape.

* * * * *